United States Patent [19]

Duffy et al.

[11] Patent Number: 4,616,670

[45] Date of Patent: Oct. 14, 1986

[54] HIGH-LOW PRESSURE PILOT

[75] Inventors: John W. Duffy, Tama, Iowa; Robert A. Funke, Anna, Tex.; David W. Shollenbarger, Marshalltown, Iowa

[73] Assignee: Fisher Controls International, Inc., Marshalltown, Iowa

[21] Appl. No.: 725,147

[22] Filed: Apr. 22, 1985

Related U.S. Application Data

[63] Continuation of Ser. No. 459,178, Jan. 19, 1983, abandoned.

[51] Int. Cl.[4] ............................................. G05D 16/00
[52] U.S. Cl. ........................................... 137/84; 251/86
[58] Field of Search .................... 137/82, 84, 85, 86; 251/86

[56] References Cited

U.S. PATENT DOCUMENTS

| | | | |
|---|---|---|---|
| 2,740,425 | 4/1956 | Garland | 251/86 X |
| 2,809,010 | 10/1957 | Ipsen | 251/86 |
| 3,145,722 | 8/1964 | Mueller | 137/82 X |
| 3,297,044 | 1/1967 | Thorburn | 137/82 |
| 3,511,270 | 5/1970 | Fehrenbach | 251/86 X |
| 3,878,863 | 4/1975 | Snyder | 137/82 X |

*Primary Examiner*—Alan Cohan
*Attorney, Agent, or Firm*—Marshall, O'Toole, Gerstein, Murray & Bicknell

[57] ABSTRACT

An extremely accurate and reliable fluid pressure sensor for monitoring process pressure and sensing when predetermined pressure set points or limits have been reached. A Bourdon tube with a pivotally moving lever end responds to the process pressure. When the process pressure is within the desired pressure range, a fluid operated block and bleed relay is operated to provide a first pressure level at its outlet. As the preset pressure point is reached, the relay is operated to provide a change in the outlet pressure level for actuating suitable safety units. A pivoting beam responds to pivoting movement of the Bourdon tube lever arm about the pressure set points and effectively amplifiers or increases such movement to rapidly operate the relay. Snap-acting cap means with a self-aligning disc cap a nozzle port in the relay in response to pivoting beam movement.

10 Claims, 8 Drawing Figures

HIGH-LOW PRESSURE PILOT

This application is a continuation, of application Ser. No. 459,178, filed Jan. 19, 1983 now abandoned.

This invention relates to fluid pressure sensing devices and in particular to such devices for monitoring pressure and detecting conditions wherein the pressure extends beyond a predetermined pressure, that is, either by extending above a high pressure limit or, by extending below a low pressure limit.

BACKGROUND OF THE INVENTION

Various types of fluid pressure sensing devices are currently available for use as safety devices in the monitoring and sensing of process pressures such as at oil and gas wells, petrochemical sources, and associated production and processing installations. The U.S. Government has specified certain performance and safety requirements for such pressure sensors, known in the trade as "pressure pilots". The required sensors or pilots must be highly accurate and extremely reliable in order to properly protect production equipment, operating personnel and the environment at oil and gas drilling and processing plants on off-shore installations.

Thus, presently available pressure sensors or pressure pilots are designed to automatically activate or trip safety shutdown systems when the sensed process pressure either extends above a previously set high pressure point or extends below a low pressure set point. When the process pressure returns to the desired safe range within the high and low pressure set point limits, the pressure sensor should be capable of automatic reset.

Therefore, it is desirable that a pressure sensor be capable of accurate set point tripping under repeated conditions (this function being known as "set point repeatability"), and once tripped should have the capability to reset within a fairly narrow zone (commonly known as "trip-to-reset"). Thus, it is desired that the tripping and resetting operations be accomplished very rapidly so as to provide a snap-acting operation in pressure ranges around the set point. In addition, it is desired that such pressure sensors be compact, protected from the environment, capable of installation in a variety of conditions, capable of being repaired in the field, and capable of providing high-only, low-only, or high and low pressure set points or pressure limits.

Many if not all presently available pressure pilots do not have all of the desired features. Certain pressure pilots are simple in construction and of rugged design as well as field repairable, but provide only a single high or low pressure set point capability with poor set point repeatability as well as a large set point trip-to-reset zone. Other available pressure sensor units of more complicated and therefore higher priced construction provide both high and low pressure set point capability, but may be highly sensitive to vibrations. This may result in poor set point repeatability and an excessive trip-to-reset zone. In addition, many of these units undesirably provide interactive set points; are not field repairable; and do not permit flexible mounting installations.

SUMMARY OF THE INVENTION

In accordance with the principles of the present invention, there is provided a highly reliable, accurate pressure sensor for sensing pre-set high and/or low pressures with extremely reliable set point repeatability. The sensor further provides: a low set point trip-to-reset zone; low sensitivity to vibrations; non-interactive high/low pressure set point; and a field repairable unit capable of flexible mounting installations.

In accordance with one aspect of the invention, there is provided a pressure sensor which includes a Bourdon tube sensing the process pressure and having one end which moves in a first direction with increasing pressures and in a second direction with decreasing pressures, means for setting one or more predetermined pressure set points, a lever arm pivotally mounted to the moving Bourdon tube end, a fluid operated relay responding to pivotal movement of the lever arm when the set pressure point is exceeded for changing the pressure level at an outlet port, and a pivotally mounted beam engageable by the lever arm for operating the relay. The beam amplifies the small pivotal movement of the Bourdon tube lever arm to enable the sensor to be more responsive to process pressure changes. Self-aligning means on the pivotal beam are provided for closing a nozzle port in the relay with a capping member when the Bourdon tube sensed process pressure is within the desired range and for quick release opening of the nozzle port when the sensed pressure has reached the pressure set point, thereby providing a snap-acting change in the pressure level at the relay outlet port.

As mentioned above, the beam functions as a motion amplification arm so that when the sensed process pressure is no longer exceeding the set point, the lever arm acts on the pivoting beam to immediately snap close the nozzle port to provide quick resetting of the pressure pilot. If the sensed process pressure exceeds the set point, the correspondingly moving lever arm becomes disengaged from the pivoting beam, thereby permitting a beam flexure spring to pivot the beam and thereby move the capping member quickly away from the nozzle port. This enables a very crisp uncapping of the relay and a snap-acting pressure level change at the relay output port. A significant advantage is obtained by the aforementioned combination in that vibration sensitivity is virtually eliminated thereby effecting reliable tripping and resetting of the pressure pilot.

In another aspect of the invention, the nozzle port capping member is self-aligning with respect to the nozzle port so as to provide reliable capping thereof. The capping member includes a self-aligning disc mounted to a ball pivot captured in the free end of the pivoting beam. Thus, as the beam free end moves towards the nozzle port, the disc will pivot and self-align itself into a reliable nozzle capping position. A series of alignment posts are provided surrounding the nozzle port so that if the disc is slightly out of line with the nozzle port, one portion of the disc will encounter an alignment post and the disc will then move on its ball pivot and be directed into a reliable capping position.

A pressure sensor constructed in accordance with the principles of the present invention provides all of the aforementioned desirable features for such a unit. In particular, the present invention provides a pressure sensing unit having highly accurate set point repeatability characteristics as well as desirable set point trip-to-reset characteristics in an extremely reliable, field repairable, flexibly mountable combination not attained by prior devices.

BRIEF DESCRIPTION OF THE DRAWINGS

Reference may be made to the following description taken in conjunction with the accompanying drawings, in which like reference numerals identify like elements in the several figures and in which.

DETAILED DESCRIPTION

Figure 1:
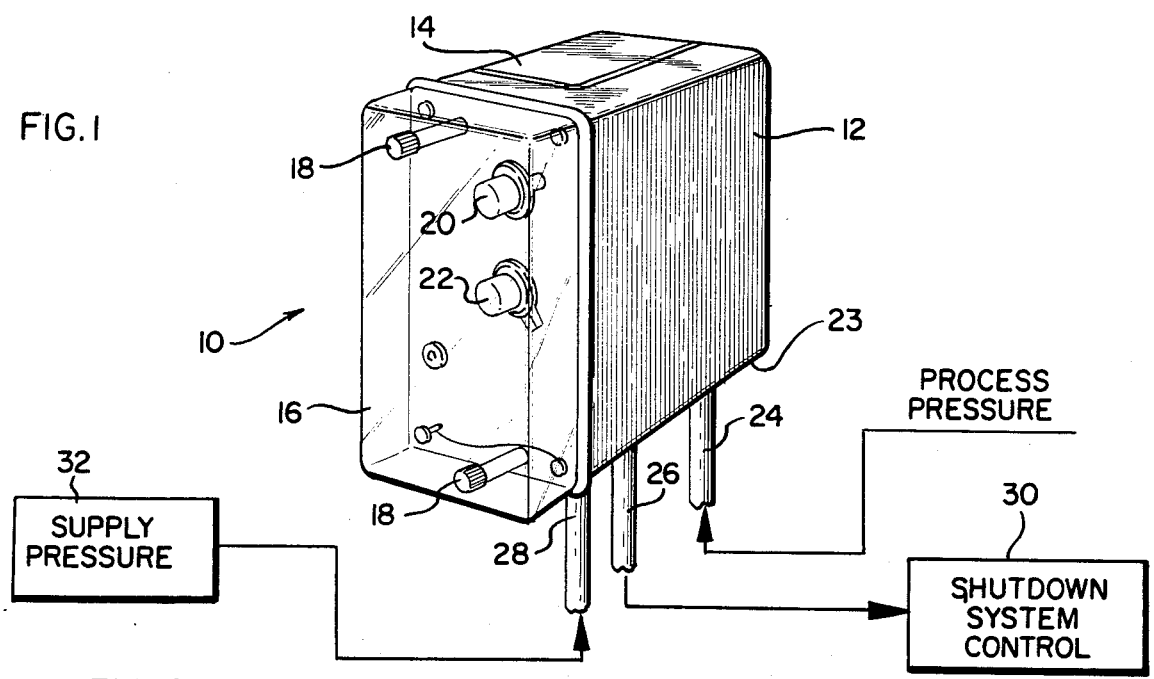
FIG. 1 is a perspective view showing a pressure sensor or pressure pilot in accordance with the principles of the present invention.

FIG. 1 illustrates a pressure sensor or pressure pilot 10 in accordance with the principles of the present invention. The pilot unit includes a cabinet or frame 12, having a side cover 14 and a front cover 16. Captured screws 18 are provided for removing the front cover and a similar captured screw (not shown) is provided for removing the side cover. Knobs 20, 22 are respectively provided for presetting the desired low and high pressure set points. The frame includes suitable fittings on its bottom or base 23 for connecting fluid lines or tubing 24, 26 and 28. Tubing 24 is coupled to the pressure to be sensed, hereinafter termed the "process pressure". It is to be understood that the process pressure may be any one of a variety of fluid pressures to be sensed, i.e., gas or liquid, depending upon whether the pressure sensor is to be mounted at an oil or gas drilling site, a petrochemical processing or production installation, an off-shore facility, etc.

Tubing 26 couples the output of sensor 10 to an actuator in a shut-down system control 30. Sensor 10 provides a pressure change at output conduit tubing 26 in the event the sensed process pressure exceeds the desired pressure range, and also provides a pressure change when the pressure returns to the desired pressure range. Tubing 28 is coupled to a normally regulated supply pressure 32, such as compressed air. In some cases, it may be desirable to utilize a portion of the process pressure for the supply pressure, for instance where the process pressure is derived from natural gas. If so, sensor 10 provides significant advantages over prior devices in preventing undesired loss of the process fluid as will be more particularly described hereinafter. It is to be understood that while the supply pressure is normally obtained from an air or gas pressure source, a liquid pressure source may be utilized. Hence, "fluid" herein refers to gas or liquid states.

Figure 2:
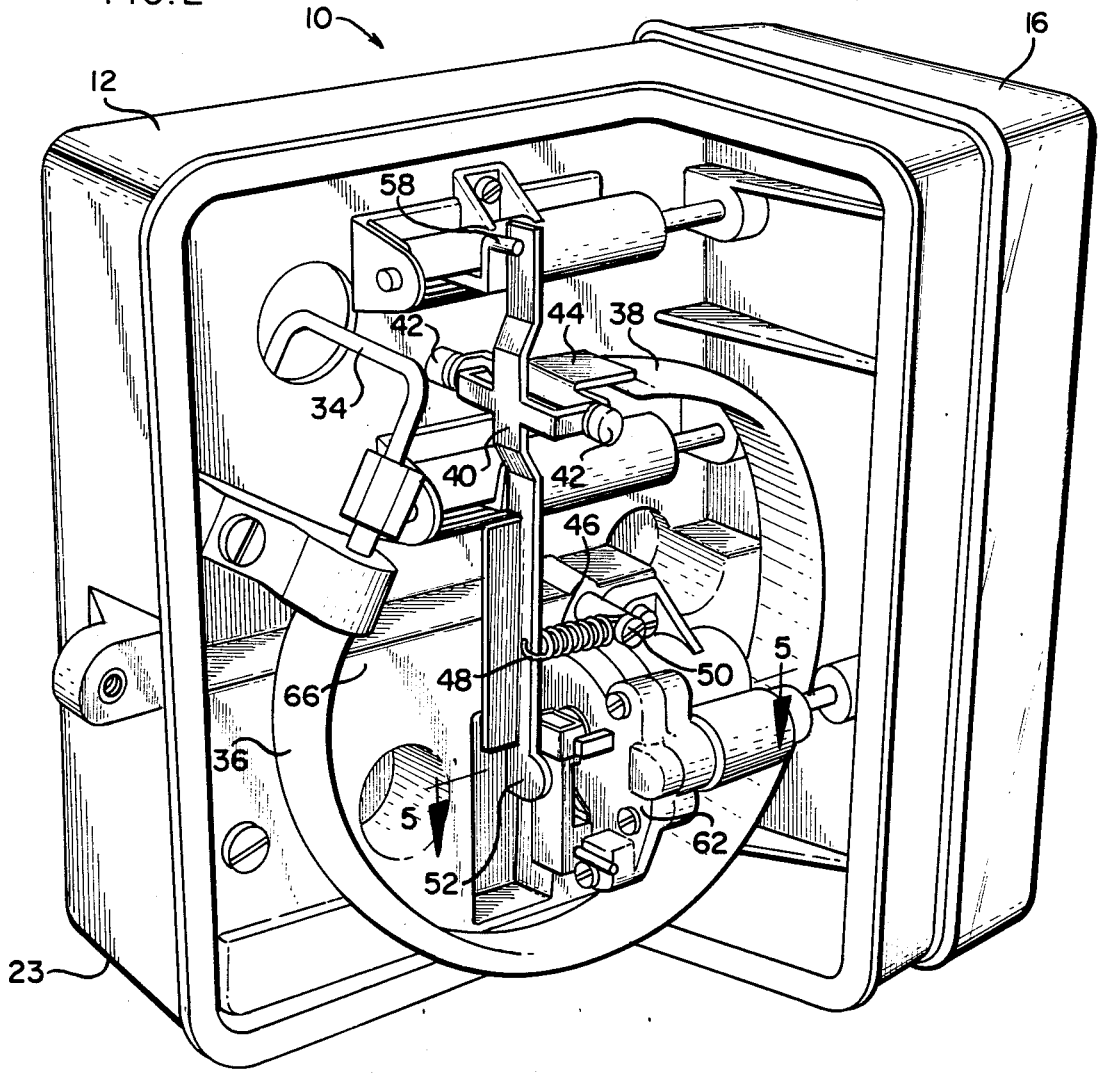
FIG. 2 is a perspective view showing the device of FIG. 1 with one of its covers removed to illustrate the components thereof, including a Bourdon tube and lever arm, high and low pressure set point assembly, a fluid operated relay, and means for rapidly operating the relay.

FIG. 2 illustrates the cabinet or frame with cover 14 removed. With reference to FIGS. 1-5, tubing 24 is coupled to an inlet line 34 of a Bourdon tube 36 having a moving end 38. A lever arm 40 is pivotally connected to Bourdon tube end 38 through a pair of pivot pins 42 and bracket 44 which, in turn, is rigidly mounted to Bourdon tube end 38. A return spring 46 has one end 48 mounted through a suitable aperture in lever arm 40 and another end rigidly mounted in position by screw 50 such that end 52 of the lever arm is biased towards screw 50 to reduce movement of end 52 during vibration.

A pair of similar set point assemblies 54, 56 are provided for respectively setting a desired low pressure set point and a high pressure set point. Reference may be made to a co-pending application of D. Shollenbarger, assigned to the same assignee as the present application for details of set point assembly 54, 56. For purposes of the present invention, it need only be understood that the respective set points are established through adjustment knobs 20, 22 to move a respective low pressure set post 58 and a high pressure set post 60. It may be noted with reference to FIGS. 3 and 4 that the pivoting connection with lever arm 40 and Bourdon tube end 38 is placed between low pressure set post 58 and high pressure set post 60 with the set posts 58 and 60 on opposite sides of the lever arm.

A fluid operated relay 62 is suitably mounted to the frame and includes an inlet port 64 coupled through manifold 66 to supply pressure conduit 28 and supply pressure 32. As previously indicated, relay 62 is normally pneumatically operated, however, if so desired, the relay may be operated by a liquid pressure. Relay 62 also includes an outlet port 68 coupled through manifold 66 to ouput conduit 26 and system control 30.

Figure 5:
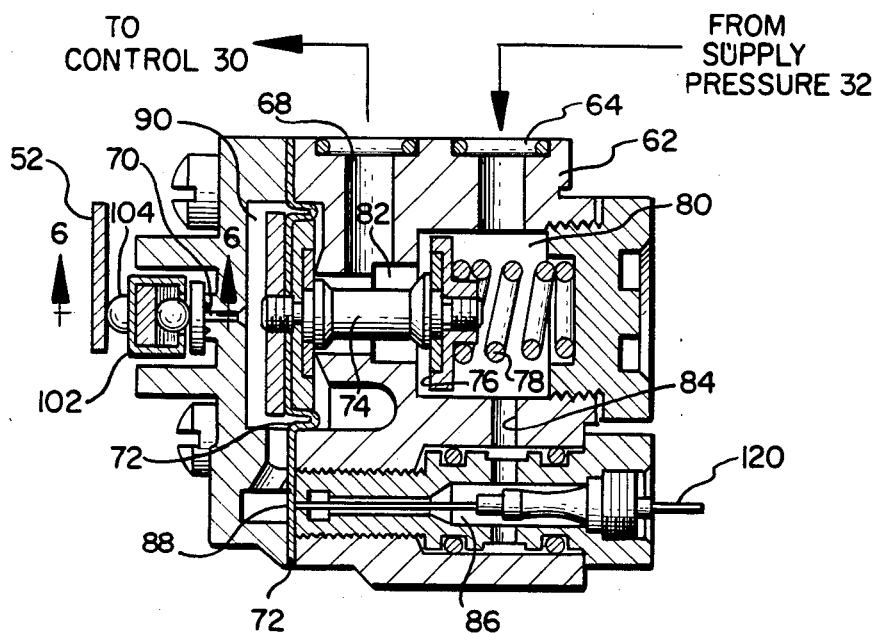
FIG. 5 is a sectional elevational view taken along section lines 5—5 of FIG. 2, illustrating the relay with its nozzle port in the capped position.

FIG. 5 illustrates the construction details of fluid operated relay 62, which is commonly known as a block and bleed relay, in that when the relay is operated, the pressure at inlet port 64 is blocked from the output port 68 and the output pressure at port 68 is vented. As may be seen from FIG. 5, relay 62 also includes a nozzle port 70 and a diaphragm 72, a piston 74, piston seal member 76 and a spring 78. In the relay position shown in FIG. 5, input port 64 is in communication with a cavity 80, and through communicating cavity 82, also with output port 68. Thus, in the normally operated relay position, the supply pressure source 32 is coupled through tubing 28, relay 62 and tubing 26 to supply a first pressure level to system control 30.

Figure 6:
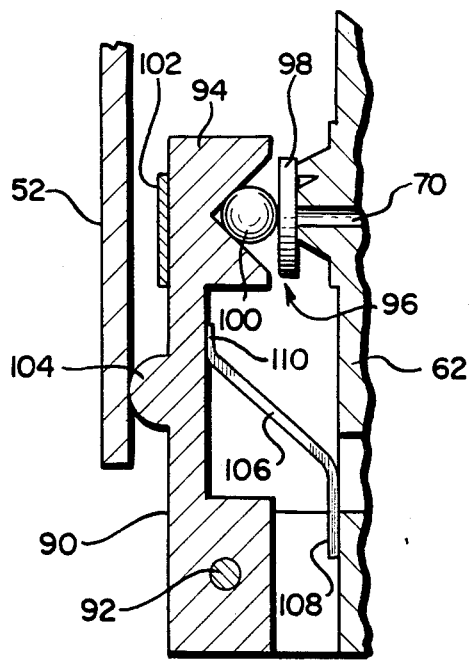
FIG. 6 is an enlarged sectional view, partly fragmented illustrating the Bourdon tube lever arm acting on a pivoting beam to place a nozzle port capping member in position on the nozzle port.

A second path is provided for coupling the pressure from inlet port 64 through cavity 80, connecting conduits 84, 86 to a small orifice at reference numeral 88 in diaphragm 72 so as to pass into the illustrated cavity 90 on the opposite side of diaphragm 72. In the condition shown in FIG. 5, with nozzle port 70 closed off, there is a slightly higher pressure in cavity 90 at one side of the diaphragm than there is on the other side of the diaphragm, such as in cavities 80, 82. However, uncapping of nozzle port 70 lowers the pressure in cavity 90 resulting in a lower pressure differential on the opposite sides of diaphragm 72 than on the opposite sides of piston seal 76. This pressure differential acts with spring 78 to rapidly force piston 74 outwardly in a snap-acting manner so as to place piston seal 76 in position to rapidly close off cavity 80 from cavity 82. This snap-acting relay action effectively blocks the supply pressure at inlet port 64 from the output port 68, thereby providing a rapid change in the pressure level at the output port which is coupled to the shutdown system control Capping and uncapping of nozzle port 70 in accordance with the principles of the present invention is shown most clearly with reference to FIGS. 3–8. In particular, a beam 90 (see FIGS. 6 and 7) is pivotally mounted at one end by means of a pivot pin 92 to relay 62. Pivoting beam end 94 includes a nozzle port capping member 96 in which self-aligning capping disc 98 is attached to a pivoting ball 100 captured in beam end 94 by means of a U-shaped clip 102. Beam 90 includes a rounded, semi-spherical protrusion 104 extending outwardly from the beam surface so as to selectively engage end 52 of the Bourdon tube lever arm 40 in a tangential point contact manner. A flexure spring 106 has one end 108 attached to relay 62 and a free end 110 in contact engagement with beam 90 to urge beam 90 pivotally in a direction outwardly for rapidly uncapping nozzle port 70.

Figure 3:
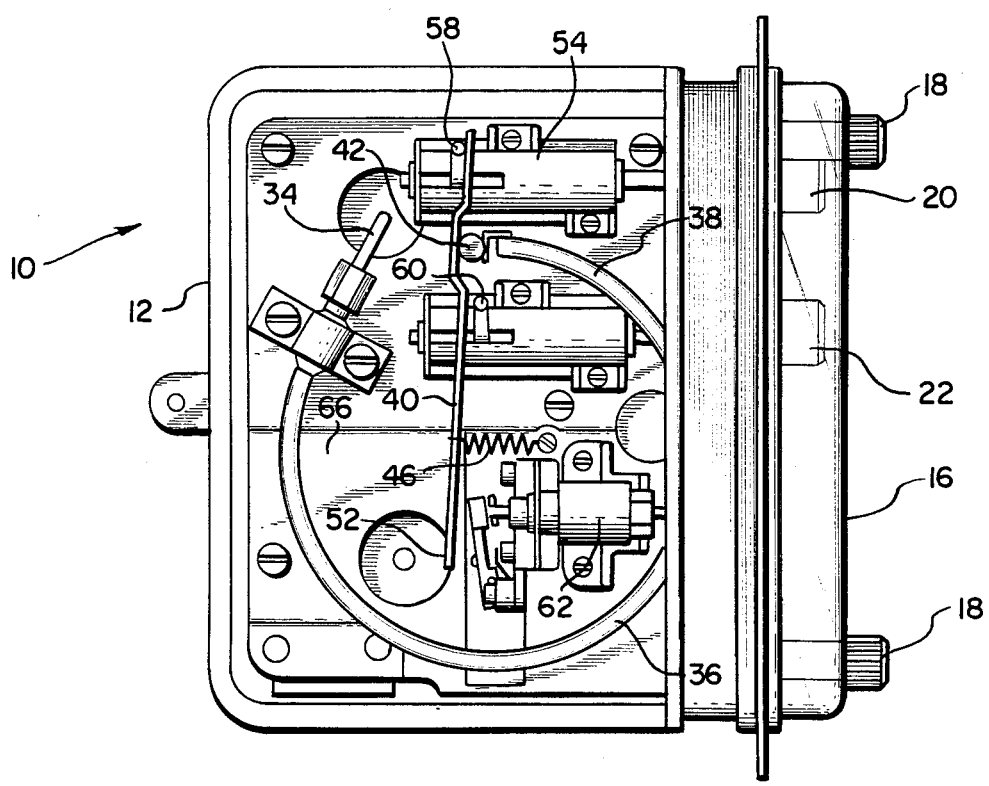
FIG. 3 is an elevational view of the unit of FIG. 2, illustrating the position of the components upon sensing a process pressure exceeding a preset low pressure point to rapidly operate the relay.
Figure 4:
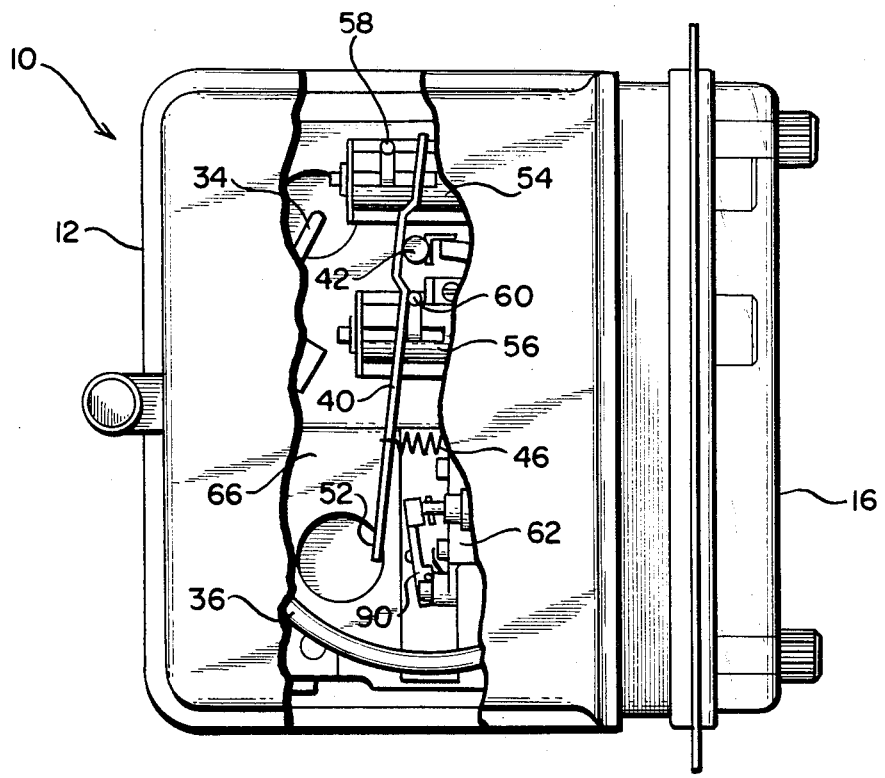
FIG. 4 is an elevational view of the pressure sensor of FIG. 2, illustrating the position of the components upon sensing a process pressure exceeding a high pressure set point to rapidly operate the relay.

Reference may be made to FIGS. 3 and 4, wherein it may be seen that when lever arm end 52 is not engaging protrusion 104 on beam 90, i.e., during sensed pressure levels either beyond the high or below the low set points, beam flexure spring 106 is formed so as to pivot beam 90 and thereby move nozzle capping member 96 away from nozzle port 70 so as to operate relay 62. On the other hand, if the sensed pressure is within the preset low and high pressure range, i.e., the set pressure range has not been exceeded, then lever 40 and corresponding lever end 52 is in the position shown in FIGS. 5, 6 and 7 to operate relay 62. As illustrated, lever end 52 (being pulled by spring 46) engages protrusion 104 to pivot beam 90 towards the relay 62. This moves nozzle port capping member 96 towards nozzle port 70.

Figure 7:
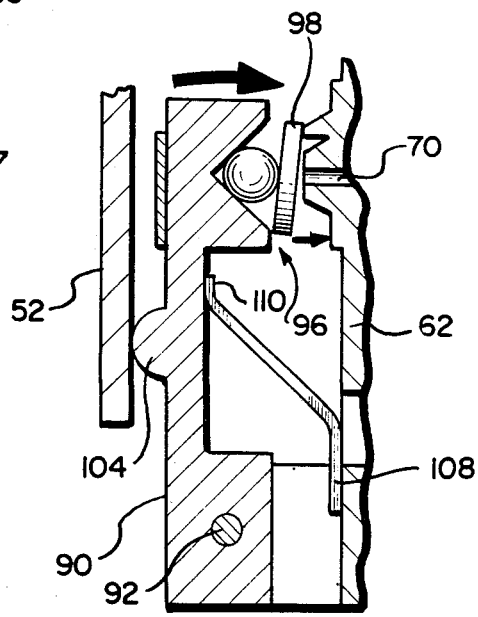
FIG. 7 is a sectional view similar to that shown in FIG. 6, illustrating a self-aligning disc being moved into capping position on the nozzle port.
Figure 8:
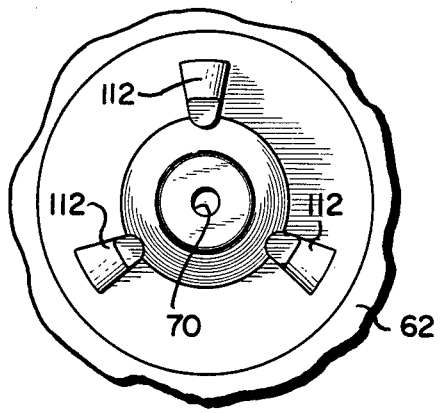
FIG. 8 is a plan view, enlarged and fragmented illustrating the nozzle port surrounded by a series of alignment posts.

With reference to FIG. 7, it may be seen that self-aligning capping disc 98 initially engages one of three alignment posts 112 surrounded nozzle port 70. Thus, in the event disc 98 is not in closing alignment with nozzle port 70, the initial engagement with one of the alignment posts 112 enables the disc to pivot rapidly so as to close port 70 in a snap action.

It may be noted that beam 90 with protrusion 104 and point contact engaging lever arm end 52 provides an amplification of the movement of lever arm 40 as the lever arm encounters either of the pressure posts 58 or 60. This enables a very sensitive response to process pressure changes with a snap-acting cap action on nozzle port 70 to rapidly operate relay 62, and along with the self aligning disc 98 provides the desired set point repeatability and the desired set point trip-to-reset zone. Furthermore, this combination ensures reliable closure and sealing of nozzle port 70, even under severe vibration conditions so as to prevent undesired leakage of valuable process fluid, such as natural gas, when utilized as the supply pressure coupled to relay inlet 64. A unit test member 120 is provided for manual actuation by an operator so as to clean out orifice 88 and check the supply pressure to relay 62.

The foregoing detailed description has been given for clearness of understanding only, and no unnecessary limitations should be understood therefrom, as modificatins will be obvious to those skilled in the art.

What is claimed is:

1. A pressure pilot monitoring a process fluid pressure and for sensing predetermined high and low fluid pressure set points to control a process shutdown system when the monitored process pressure extends beyond the high or low pressure set points, said pressure pilot comprising:

a frame;

a Bourdon tube mounted on said frame having an input end coupled to the process fluid pressure and a moving output end responding to the process fluid pressure to move in a first direction upon sensing a decreasingly lower pressure and in a second direction upon sensing an increasingly higher pressure;

means mounted on said frame, including a pair of pivot members for setting a respective low pressure set point and a high pressure set point;

a lever arm pivotally mounted to said Bourdon tube moving output end between said pair of pivot members, including means enabling said lever arm to move in said first direction and contact one of said pivot members when the Bourdon tube senses a pressure reaching the low pressure set point and thereby pivoting the lever arm, and enabling the lever arm to move in a second direction and contact the other of said pivot members when the Bourdon tube senses a pressure reaching the preset high pressure set point to thereby pivot the lever arm;

a fluid operated relay mounted on said frame having an inlet port for connection to a fluid pressure line, an outlet port, and a nozzle port, wherein the inlet port is in fluid communication with the outlet port with the nozzle port closed, and wherein the inlet port is blocked from the outlet port with the nozzle port opened;

relay operating cap means responding to engagement with said lever arm for rapdily snap-closing said nozzle port when said sensed fluid pressure is between said low and high pressure set points and for responding to non-engagement with said lever arm for quick release opening of said nozzle port when said sensed fluid pressure has reached either said low or said high pressure set points, thereby providing a pressure level change at the relay outlet port;

said fluid operated relay includes a piston having a piston seal at one end and a diaphragm at the other end, said piston seal being adapted to seal the inlet port from the outlet port with the outlet port being coupled through the inlet port to said pressure line with the nozzle port closed, and the diaphragm having the nozzle port on one diaphragm side and the outlet port on the other diaphragm side, and including means for for developing a higher positive pressure on the outlet port side of the diaphragm than on the nozzle port side of the diaphram in response to unsealing of said nozzle port, thereby providing a positive movement of the diapragm towards the nozzle port and a corresponding rapid, snap-acting sealing of the inlet port from the outlet port by the piston seal; and said relay operating means includes snap-acting cap means having a self-aligning cap member adapted for self-alignment with said nozzle port upon movement into engagement therewith.

2. A fluid pressure sensor according to claim 1, wherein said relay operating means includes a motion amplification arm immediately responding to pivotal movement of said Bourdon tube lever arm about said respective pivot members to rapidly operate said relay.

3. A fluid pressure sensor according to claim 1, wherein said snap-acting cap means includes a ball rigidly mounted to said disc member, and means for pivotally mounting said ball within said snap-acting means.

4. A fluid pressure sensor according to claim 2, wherein said motion amplification arm includes said disc member pivotably mounted therein for sealing said nozzle port.

5. A fluid pressure sensor according to claim 2, including a semi-spherical protrusion on said motion amplification arm engageable by said lever arm for providing positive sealing of said nozzle port, and further including bias means for urging said motion amplification arm away from said nozzle port upon non-engagement of said lever with said motion amplification arm.

6. A pressure pilot for monitoring a process fluid pressure and for sensing predetermined high and low pressure set points to control a process shutdown system when the monitored process pressure extends beyond the high or low pressure set points, said pressure pilot comprising:
a frame;
a Bourdon tube mounted on said frame having an input end coupled to the process pressure and a moving output end responding to the process pressure to move in a first direction upon sensing an increasing pressure and in a second direction upon sensing a decreasing pressure;
means mounted on said frame, including a pair of pivot members for setting a respective low pressure set point and a high pressure set point;
a lever arm pivotally mounted to said Bourdon tube moving output end between said pair of pivot members including means enabling said lever arm to contact one of said pivot members upon moving in said first direction when sensing a pressure reaching said first set point and to contact the other of said pivot members upon moving in a second direction when sensing a pressure reaching said second set point;
a fluid operated relay mounted on said frame having an inlet port adapted for connection to a pressure line, an outlet port, and a nozzle port, said fluid operated relay including means for providing a pressure level change at the outlet port in response to capping/uncapping of the nozzle port;
a beam mounted for pivotal movement with respect to said fluid operated relay, said beam having a capping disc adapted to cap said nozzle port in response to selective engagement of said beam with said lever arm, thereby providing a pressure level change at the relay outlet port;
said capping disc including a disc member pivotally mounted on said beam to enable said disc member to self-align with said nozzle port upon movement into contact therewith and to snap-close said nozzle port; and
said fluid operated relay includes a piston having a piston seal at one end and a diaphragm at the other end, said piston seal being adapted to seal the inlet port from the outlet port with the outlet port being coupled through the inlet port to said pressure line with the nozzle port closed, and the diaphragm having the nozzle port on one diaphragm side and the outlet port on the other diaphragm side, and including means for developing a higher positive pressure on the outlet port side of the diaphragm than on the nozzle port side of the diaphram in response to unsealing of said nozzle port, thereby providing a positive movement of the diaphragm towards the nozzle port and a corresponding rapid, snap-acting sealing of the inlet port from the outlet port by the piston seal.

7. A fluid pressure sensor according to claim 6, wherein said fluid operated relay includes means for placing the inlet port in fluid communication with the outlet port when the nozzle port is sealed, and for blocking the inlet port from the outlet port when the nozzle port is unsealed; said lever arm having one end adjacent said pair of pivot members and an opposite second end adjacent said nozzle port; and said lever arm second end engaging said beam for sealing said nozzle port and moving to non-engagement with said beam for unsealing said nozzle port.

8. A fluid pressure sensor according to claim 7, including bias means for rapidly pivotally moving said beam when the beam is disengaged from the lever arm second end.

9. A fluid pressure sensor according to claim 8, wherein said bias means includes a spring adapted to move said beam away from the nozzle port to obtain a quick release opening of the nozzle port when the sensed pressure exceeds a set point.

10. A fluid pressure sensor according to claim 6, wherein said relay includes a series of alignment posts disposed around said nozzle port for aiding in self-aligning movement of the disc with the nozzle port.

* * * * *